(12) United States Patent
Chen et al.

(10) Patent No.: US 9,960,863 B2
(45) Date of Patent: May 1, 2018

(54) ESTIMATION APPARATUS AND METHOD FOR A NONLINEAR CHARACTERISTIC

(71) Applicant: FUJITSU LIMITED, Kawasaki-shi, Kanagawa (JP)

(72) Inventors: Hao Chen, Beijing (CN); Lei Li, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/086,865

(22) Filed: Mar. 31, 2016

(65) Prior Publication Data
US 2016/0294489 A1 Oct. 6, 2016

(30) Foreign Application Priority Data

Mar. 31, 2015 (CN) .......................... 2015 1 0147371

(51) Int. Cl.
| | | |
|---|---|---|
| H04B 1/38 | (2015.01) | |
| H04B 15/00 | (2006.01) | |
| H03K 5/01 | (2006.01) | |
| H04B 1/10 | (2006.01) | |
| H04B 17/13 | (2015.01) | |
| H04B 17/309 | (2015.01) | |

(52) U.S. Cl.
CPC ........... *H04B 17/13* (2015.01); *H04B 17/309* (2015.01)

(58) Field of Classification Search
USPC ........... 375/229–236, 219, 220, 240, 240.02, 375/240.04–240.07, 240.26–240.29, 285, 375/284, 295, 316, 343, 340, 350, 346
See application file for complete search history.

(56) References Cited

U.S. PATENT DOCUMENTS

| | | | | |
|---|---|---|---|---|
| 5,703,903 | A * | 12/1997 | Blanchard | H04L 25/03038 375/232 |
| 6,501,805 | B1 * | 12/2002 | Twitchell | H03F 1/3247 330/149 |
| 2002/0105595 | A1 * | 8/2002 | Felts, III | H04N 11/18 348/639 |
| 2011/0175678 | A1 * | 7/2011 | Velazquez | H03F 1/3247 330/149 |
| 2011/0243561 | A1 * | 10/2011 | Li | H04B 10/611 398/65 |
| 2012/0280749 | A1 * | 11/2012 | Kumar | H03F 1/3294 330/149 |

(Continued)

OTHER PUBLICATIONS

Jung et al, Estimating models of inverse systems, 52nd IEEE Conference on Decision and Control, Dec. 10-13, 2013, pp. 7143-7148.*

(Continued)

*Primary Examiner* — Linda Wong
(74) *Attorney, Agent, or Firm* — Staas & Halsey LLP

(57) ABSTRACT

Embodiments of the present disclosure provide an estimation apparatus and method for a nonlinear characteristic, which may simply and quickly estimate the nonlinear characteristic of a system to be measured by calculating parameters of the nonlinear model of the system to be measured according to the fundamental power and harmonic power of output signals of the system to be measured on at least two frequency spots obtained through measurement, with the accuracy of the result of estimation being relatively high.

10 Claims, 5 Drawing Sheets

(56) References Cited

U.S. PATENT DOCUMENTS

| | | | | |
|---|---|---|---|---|
| 2012/0290296 | A1* | 11/2012 | Sugiyama | G10L 21/0208 704/226 |
| 2013/0259159 | A1* | 10/2013 | McCallister | H03F 1/0266 375/297 |
| 2014/0044376 | A1* | 2/2014 | Gohshi | H04N 5/142 382/263 |
| 2014/0139287 | A1* | 5/2014 | Oishi | H03F 3/24 330/149 |
| 2014/0146911 | A1* | 5/2014 | Eliaz | H04B 1/16 375/285 |
| 2015/0032788 | A1* | 1/2015 | Velazquez | H04L 27/265 708/819 |
| 2015/0043678 | A1* | 2/2015 | Hammi | H04B 1/0475 375/297 |
| 2015/0185717 | A1* | 7/2015 | Sayyar-Rodsari | G05B 13/042 700/31 |
| 2016/0087604 | A1* | 3/2016 | Kim | H03H 17/0261 708/304 |
| 2017/0078046 | A1* | 3/2017 | Chen | H04L 1/0017 |
| 2017/0227585 | A1* | 8/2017 | Chen | G01R 23/20 |

OTHER PUBLICATIONS

Brouri et al, Frequency Identification of Hammerstein-Wiener Systems with Backlash input nonlinearity, WSEAS Transactions on Systems and Control, vol. 12, 2017, pp. 82-94.*

Abd-Elrady et al, Identification of Hammerstein and Wiener Models Using Spectral Magnitude Matching, IFAC Proceedings of the 17th World Confgress, The internationl Federation of Automatic Control, Jul. 6-11, 2008, pp. 6440-6445.*

Wills et al, Identification of Hammerstein-Wiener Models, Automatica, vol. 49, pp. 70-81, Jan. 2013.*

Tan et al, Identification of Wiener-Hammerstein Models of Using Linear Interpolation in the Frequency Domain, IEEE Transactions on Instrumentation and Measurement, vol. 51, No. 3, Jun. 2002, pp. 509-521.*

* cited by examiner

ESTIMATION APPARATUS AND METHOD FOR A NONLINEAR CHARACTERISTIC

CROSS-REFERENCE TO RELATED APPLICATIONS

This application claims the priority benefit of Chinese Patent Application No. 201510147371.7, filed on Mar. 31, 2015 in the Chinese State Intellectual Property Office, the disclosure of which is incorporated herein in its entirety by reference.

BACKGROUND

1. Field

The present disclosure relates to the field of communications, and in particular to an estimation apparatus and method for a nonlinear characteristic.

2. Description of the Related Art

As the development of communication technologies, transmission rates of a communication system are continuously increased, and a nonlinear characteristic of the communication system has become one of main factors affecting the system performance. In order to deal with the nonlinear characteristic of the communication system, the nonlinear characteristic needs to be estimated.

Existing methods for estimating the nonlinear characteristic includes mainly the following two methods: the first method is to directly compare an input time-domain waveform and an output time-domain waveform of a system to be measured, so as to obtain an input-output transfer function of the system to be measured, thereby estimating the nonlinear characteristic of the system to be measured; and the second method is to first establish a nonlinear model of the system to be measured, and then train model coefficients by using a training sequence or an iterative method, thereby estimating the nonlinear characteristic of the system to be measured.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

An estimation error of the nonlinear characteristic of the system with a larger bandwidth by using the above first method is very large, which may underestimate the nonlinear characteristic, thereby resulting in a transmission failure of the system; and measurement and calculation processes in the above second method is very complicated, which is hard to satisfy requirements of high-speed communication systems.

Embodiments of the present disclosure provide an estimation apparatus and method for a nonlinear characteristic, which may simply and quickly estimate the nonlinear characteristic of the system to be measured by calculating parameters of a nonlinear model of the system to be measured according to measured fundamental power and harmonic power of output signals of the system to be measured on at least two frequency spots, with the accuracy of the result of estimation being relatively high.

According to a first aspect of embodiments of the present disclosure, there is provided an estimation apparatus for a nonlinear characteristic, including: a first calculating unit configured to respectively calculate groups of nonlinear coefficients of a nonlinear model of a system to be measured corresponding to frequency spots according to measured fundamental power and harmonic power of output signals of the system to be measured on at least two frequency spots, and take nonlinear coefficients corresponding to one of the at least two frequency spots as nonlinear coefficients of the nonlinear model of the system to be measured; a second calculating unit configured to calculate responses of a post-filter of the nonlinear model of the system to be measured according to the groups of nonlinear coefficients of the nonlinear model of the system to be measured corresponding to the frequency spots calculated by the first calculating unit; a third calculating unit configured to calculate responses of a pre-filter of the nonlinear model of the system to be measured according to measured linear filter responses of the system to be measured and the responses of the post-filter of the nonlinear model of the system to be measured calculated by the second calculating unit; and an estimating unit configured to estimate a nonlinear characteristic of the system to be measured according to the nonlinear coefficients of the nonlinear model of the system to be measured calculated by the first calculating unit, the responses of the post-filter of the nonlinear model of the system to be measured calculated by the second calculating unit and the responses of the pre-filter of the nonlinear model of the system to be measured calculated by the third calculating unit.

According to a second aspect of embodiments of the present disclosure, there is provided an estimation method for a nonlinear characteristic, including: respectively calculating groups of nonlinear coefficients of a nonlinear model of a system to be measured corresponding to frequency spots according to measured fundamental power and harmonic power of output signals of the system to be measured on at least two frequency spots, and taking nonlinear coefficients corresponding to one of the at least two frequency spots as nonlinear coefficients of the nonlinear model of the system to be measured; calculating responses of a post-filter of the nonlinear model of the system to be measured according to the groups of nonlinear coefficients of the nonlinear model of the system to be measured corresponding to the frequency spots; calculating responses of a pre-filter of the nonlinear model of the system to be measured according to measured linear filter responses of the system to be measured and the responses of the post-filter of the nonlinear model of the system to be measured; and estimating a nonlinear characteristic of the system to be measured according to the nonlinear coefficients of the nonlinear model of the system to be measured, the responses of the post-filter of the nonlinear model of the system to be measured and the responses of the pre-filter of the nonlinear model of the system to be measured.

An advantage of embodiments of the present disclosure exists in that the nonlinear characteristic of the system to be measured may be simply and quickly estimated by calculating parameters of the nonlinear model of the system to be measured according to measured fundamental power and harmonic power of output signals of the system to be measured on at least two frequency spots, without needing to perform measurement of high complexity and train the parameters of the nonlinear model, with the accuracy of the result of estimation being relatively high.

With reference to the following description and drawings, the particular embodiments of the present disclosure are disclosed in detail, and the principles of the present disclosure and the manners of use are indicated. It should be understood that the scope of embodiments of the present disclosure is not limited thereto. Embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of the present disclosure, which constitute a part of the specification and illustrate the exemplary embodiments of the present disclosure, and are used for setting forth the principles of the present disclosure together with the description. It is clear and understood that the accompanying drawings in the following description are some embodiments of the present disclosure only, and a person of ordinary skill in the art may obtain other accompanying drawings according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

Embodiment 1

Figure 1:
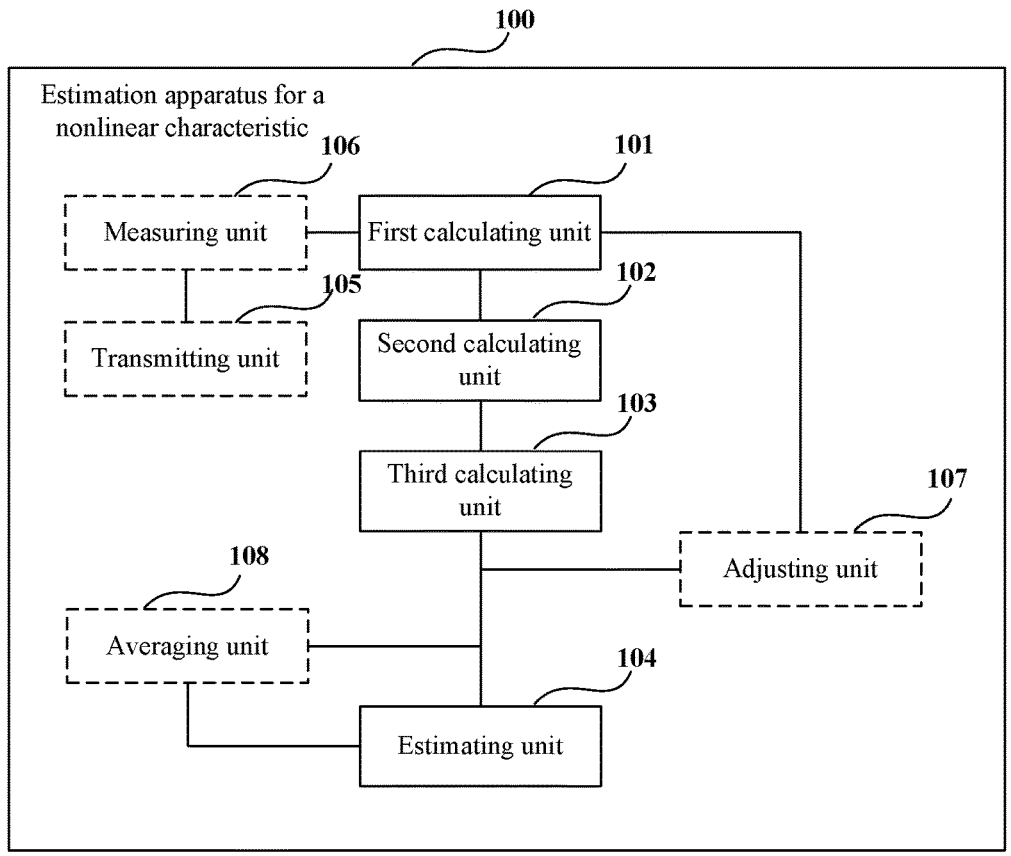
FIG. 1 is a schematic diagram of a structure of the estimation apparatus for a nonlinear characteristic of Embodiment 1 of the present disclosure.

An embodiment of the present disclosure provides an estimation apparatus for a nonlinear characteristic. FIG. 1 is a schematic diagram of a structure of the estimation apparatus for a nonlinear characteristic of Embodiment 1 of the present disclosure. As shown in FIG. 1, the apparatus 100 includes: a first calculating unit 101, a second calculating unit 102, a third calculating unit 103 and an estimating unit 104.

The first calculating unit 101 is configured to respectively calculate groups of nonlinear coefficients of a nonlinear model of a system to be measured corresponding to frequency spots according to measured fundamental power and harmonic power of output signals of the system to be measured on at least two frequency spots, and take nonlinear coefficients corresponding to one of the at least two frequency spots as nonlinear coefficients of the nonlinear model of the system to be measured.

The second calculating unit 102 is configured to calculate responses of a post-filter of the nonlinear model of the system to be measured according to the groups of nonlinear coefficients of the nonlinear model of the system to be measured corresponding to the frequency spots calculated by the first calculating unit 101.

The third calculating unit 103 is configured to calculate responses of a pre-filter of the nonlinear model of the system to be measured according to measured linear filter responses of the system to be measured and the responses of the post-filter of the nonlinear model of the system to be measured calculated by the second calculating unit 102.

The estimating unit 104 is configured to estimate a nonlinear characteristic of the system to be measured according to the nonlinear coefficients of the nonlinear model of the system to be measured calculated by the first calculating unit 101, the responses of the post-filter of the nonlinear model of the system to be measured calculated by the second calculating unit 102 and the responses of the pre-filter of the nonlinear model of the system to be measured calculated by the third calculating unit 103.

It can be seen from the above embodiment that the nonlinear characteristic of the system to be measured may be simply and quickly estimated by calculating parameters of the nonlinear model of the system to be measured according to the measured fundamental power and harmonic power of output signals of the system to be measured on at least two frequency spots, with the accuracy of the result of estimation being relatively high.

In this embodiment, the system to be measured may be any system or apparatus needing to be performed estimation of nonlinear characteristic. For example, the system to be measured may be a whole communication system, and may also be an amplifier or a laser.

Figure 2:
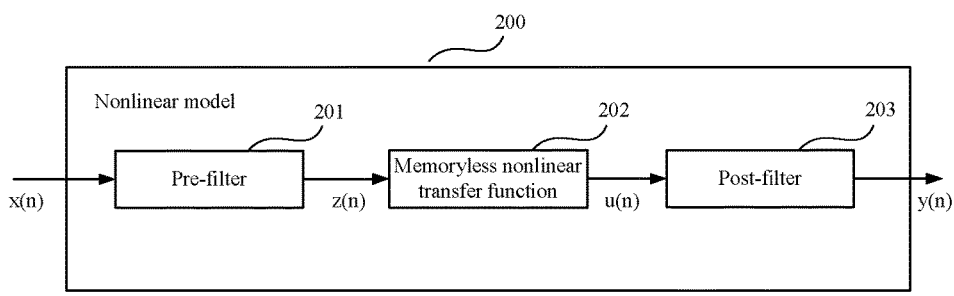
FIG. 2 is a schematic diagram of the nonlinear model of the system to be measured of Embodiment 1 of the present disclosure.

In this embodiment, a Wienner-Hammerisein nonlinear model, for example, may be used as the nonlinear model of the system to be measured. FIG. 2 is a schematic diagram of the nonlinear model of the system to be measured of this embodiment.

As shown in FIG. 2, the nonlinear model 200 includes a pre-filter 201, a memoryless nonlinear transfer function 202 and a post-filter 203. An input signal of the pre-filter 201 is $x(n)$, an output signal is $z(n)$. The signal $z(n)$ is inputted into the memoryless nonlinear transfer function 202, so as to obtain an output signal $u(n)$, and finally it passes through the post-filter 203, so as to obtain an output signal y(n) of the whole nonlinear model. For example, a transfer function of the memoryless nonlinear transfer function 202 may be expressed as Formula (1) below:

$$u(n) = z(n) + c_2 z^2(n) + c_3 z^3(n) \qquad (1);$$

where, u(n) denotes the output signal of the memoryless nonlinear transfer function 202, z(n) denotes the input signal of the memoryless nonlinear transfer function 202, and $c_2$ and $c_3$ denote nonlinear coefficients.

In this embodiment, the parameters of the nonlinear model may include the nonlinear coefficients $c_2$ and $c_3$ of the memoryless nonlinear transfer function 202, a response L1 of the pre-filter 201 and a response L2 of the post-filter 203.

In this embodiment, the nonlinear coefficients of the nonlinear model of the system to be measured refer to $c_2$ and $c_3$ of one of the frequency spots, a response of the post-filter of the nonlinear model refers to the response L2 of the post-filter 203, and a response of the pre-filter of the nonlinear model refers to the response L1 of the pre-filter 201.

In this embodiment, the first calculating unit 101 respectively calculates groups of nonlinear coefficients of the nonlinear model of the system to be measured corresponding to the frequency spots according to the measured fundamental power and harmonic power of output signals of the system to be measured on at least two frequency spots. For example, the fundamental power and harmonic power of output signals of the system to be measured on at least two frequency spots may be measured by using an existing method.

For example, the apparatus 100 of this embodiment may further include a transmitting unit 105 and a measuring unit 106.

The transmitting unit 105 is configured to respectively transmit signals of at least two frequency spots in turn, or transmit signals of at least two frequency spots at the same time, to the system to be measured, so as to be used for measuring the fundamental power and harmonic power of the output signals of the system to be measured on at least two frequency spots; and the measuring unit 106 is configured to measure the fundamental power and harmonic power of the output signals of the system to be measured on at least two frequency spots.

In this embodiment, the transmitting unit 105 and the measuring unit 106 are optional, which are shown by dotted boxes in FIG. 1.

In this way, the measurement may be performed simply and conveniently by simultaneously transmitting signals on at least two frequency spots.

In this embodiment, the fundamental power and harmonic power of the output signals on at least two frequency spots need to be measured, the harmonic may be a second harmonic or a third harmonic, and may also be a harmonic with a higher order. Following description is illustrated taking measurement of fundamental power and second harmonic power and third harmonic power of the output signals on at least two frequency spots as an example.

Figure 3:
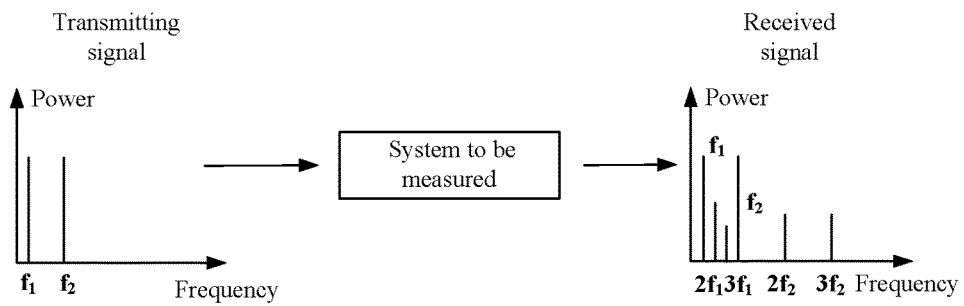
FIG. 3 is a schematic diagram of measuring fundamental power and harmonic power of Embodiment 1 of the present disclosure.

FIG. 3 is a schematic diagram of measuring fundamental power and harmonic power of this embodiment. As shown in FIG. 3, the transmitting unit 105 transmits sinusoidal signals $P_1$ and $P_2$ on two frequency spots $f_1$ and $f_2$ simultaneously to the system to be measured, fundamental power $P_{1,1}$ of the frequency spot $f_1$, second harmonic power $P_{1,2}$ of a frequency of $2f_1$, third harmonic power $P_{1,3}$ of a frequency of $3f_1$, fundamental power $P_{2,1}$ of the frequency spot $f_2$, second harmonic power $P_{2,2}$ of a frequency of $2f_2$, third harmonic power $P_{2,3}$ of a frequency of $3f_2$ of the received signal are obtained through measurement at an output end of the system to be measured.

In this embodiment, after measuring the fundamental power and harmonic power of the output signals of the system to be measured on at least two frequency spots, the first calculating unit 101 calculates the groups of nonlinear coefficients of the nonlinear model of the system to be measured corresponding to the frequency spots according to the fundamental power and harmonic power, and take nonlinear coefficients of one frequency spot as the nonlinear coefficients of the nonlinear model.

In this embodiment, in respectively calculating the groups of nonlinear coefficients of the nonlinear model of the system to be measured corresponding to the frequency spots, the first calculating unit 101 may calculate the nonlinear coefficients by using different methods according to symbols of the nonlinear coefficients. Following description is given taking calculating nonlinear coefficients corresponding to the frequency spot $f_1$ and taking the nonlinear coefficients of the frequency spot $f_1$ as the nonlinear coefficients of the nonlinear model as an example.

For example, the nonlinear coefficients corresponding to the frequency spot $f_1$ are calculated according to Formula (2) below when the nonlinear coefficients are negative numbers, and the nonlinear coefficients corresponding to the frequency spot $f_1$ are calculated according to formula (3) below when the nonlinear coefficients are positive numbers:

$$\begin{cases} A = \sqrt{2P_{1,1}} + 3\sqrt{2P_{1,3}} \\ c_2 = -\dfrac{2\sqrt{2P_{1,2}}}{A^2} \\ c_3 = -\dfrac{4\sqrt{2P_{1,3}}}{A^3} \end{cases} \qquad (2)$$

$$\begin{cases} A = \sqrt{2P_{1,1}} - 3\sqrt{2P_{1,3}} \\ c_2 = \dfrac{2\sqrt{2P_{1,2}}}{A^2} \\ c_3 = \dfrac{4\sqrt{2P_{1,3}}}{A^3} \end{cases} \qquad (3)$$

where, $c_2$ and $c_3$ denote the nonlinear coefficients corresponding to the frequency spot $f_1$, and $P_{1,1}$, $P_{1,2}$ and $P_{1,3}$ respectively denote the fundamental power, second harmonic power and third harmonic power of the output signal of the system to be measured on the frequency spot $f_1$.

In this embodiment, nonlinear coefficients corresponding to other frequency spots than the frequency spot $f_1$ may be obtained by the first calculating unit 101 by using a method identical to the method for calculating the nonlinear coefficients corresponding to the frequency spot $f_1$; furthermore, the nonlinear coefficients of the other frequency spots may also be taken as the nonlinear coefficients of the nonlinear model, which shall not be described herein any further.

In this embodiment, after the first calculating unit 101 calculates the groups of nonlinear coefficients of the nonlinear model of the system to be measured corresponding to the frequency spots, the second calculating unit 102 calculates the responses of the post-filter of the nonlinear model of the system to be measured according to the groups of nonlinear coefficients. A structure of the second calculating unit 102 of this embodiment a method for calculating the responses of the post-filter by the second calculating unit 102 shall be described below.

Figure 4:
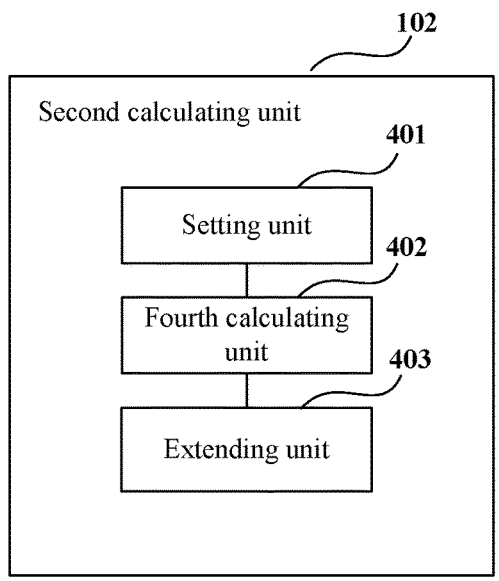
FIG. 4 is a schematic diagram of a structure of the second calculating unit 102 of Embodiment 1 of the present disclosure.

FIG. 4 is a schematic diagram of a structure of the second calculating unit 102 of this embodiment. As shown in FIG. 4, the second calculating unit 102 includes a setting unit 401 configured to set the responses of the post-filter of the nonlinear model at a fundamental wave and harmonics of an output signal of one of the at least two frequency spots to be 0 dB, and set the responses of the post-filter of the nonlinear model at fundamental waves of output signals of other frequency spots of the at least two frequency spots to be a predefined value.

A fourth calculating unit 402 configured to calculate the responses of the post-filter of the nonlinear model at harmonics of the output signals of the other frequency spots according to the groups of nonlinear coefficients corresponding to the one of the at least two frequency spots and the other frequency spots calculated by the first calculating unit 101 where, in calculating the responses of the post-filter of the nonlinear model at harmonics of the output signals of the other frequency spots, the harmonic power of the output signals of the nonlinear model on the at least two frequency spots is made to be identical to the measured harmonic power of the output signals of the system to be measured on the at least two frequency spots.

An extending unit 403 configured to extend the responses of the post-filter to a whole band according to the responses of the post-filter at the fundamental wave and the harmonics of the at least two frequency spots.

In this embodiment, the method for calculating the responses of the post-filter by the second calculating unit 102 shall be described taking two frequency spots $f_1$ and $f_2$ as examples.

In this embodiment, the setting unit 401 sets the responses of the post-filter of the nonlinear model at a fundamental wave, a second harmonic and a third harmonic of an output signal of the frequency spot $f_1$ to be 0 dB; that is, setting the responses of the post-filter to the fundamental wave and harmonics of the output signal of the frequency spot $f_1$ to be all-pass. In this embodiment, the first calculating unit 101 takes the nonlinear coefficients of the frequency spot $f_1$ as the nonlinear coefficients of the nonlinear model, that is, the frequency spot $f_1$ is taken as a reference frequency spot; if the first calculating unit 101 takes the nonlinear coefficients of the frequency spot $f_2$ as the nonlinear coefficients of the nonlinear model, the setting unit 401 sets the responses of the post-filter of the nonlinear model at a fundamental wave, a second harmonic and a third harmonic of an output signal of the frequency spot $f_2$ to be 0 dB; that is, the frequency spot $f_2$ is taken as a reference frequency spot.

The setting unit 401 sets the responses of the post-filter of the nonlinear model at a fundamental wave of an output signal of the frequency spot $f_2$ to be predefined value $rdB_{f2}$, with a unit of dB. In this embodiment, the predefined value may be set according to an actual situation. For example, the predefined value $rdB_{f2}$ is 0 dB, that is, setting the response of the post-filter to the fundamental wave of the output signal of the frequency spot $f_2$ to be all-pass.

In this embodiment, the fourth calculating unit 402 calculates the responses of the post-filter of the nonlinear model at the harmonics of the output signal of the frequency spot $f_2$ according to the nonlinear coefficients $c_2'$ and $c_3'$ corresponding to the frequency spot $f_1$ and the nonlinear coefficients $c_2'$ and $c_3'$ corresponding to the frequency spot $f_2$ calculated by the first calculating unit 101. In this embodiment, the harmonic power of the output signals of the nonlinear model on the frequency spots $f_1$ and $f_2$ is made to be identical to the measured harmonic power of the output signals of the system to be measured on the frequency spots $f_1$ and $f_2$.

For example, the fourth calculating unit 402 may calculate the responses of the post-filter at the harmonics of the output signal of the frequency spot $f_2$ according to formulae (4) and (5) below:

$$rdB_{2f2} = 20*\log10\left(\frac{c_2'}{c_2}\right) + 2*rdB_{f2}, \quad (4)$$

$$rdB_{3f2} = 20*\log10\left(\frac{c_3'}{c_3}\right) + 3*rdB_{f2}; \quad (5)$$

where, $rdB_{2f2}$ denotes the response of the post-filter at the second harmonic of the output signal of the frequency spot $f_2$, $rdB_{3f2}$ denotes the response of the post-filter at the third harmonic of the output signal of the frequency spot $f_2$, $rdB_{f2}$ denotes the response of the post-filter at the fundamental wave of the output signal of the frequency spot $f_2$, $c_2$ and $c_3$ denote the nonlinear coefficients corresponding to the frequency spot $f_1$, and $c_2'$ and $c_3'$ denote the nonlinear coefficients corresponding to the frequency spot $f_2$.

In this embodiment, the setting unit 401 sets the responses of the post-filter at the fundamental wave, the second harmonic and the third harmonic of an output signal of the frequency spot $f_1$ to be 0 dB, and sets the response of the post-filter at a fundamental wave of an output signal of the frequency spot $f_2$ to be $rdB_{f2}$. The fourth calculating unit 402 obtains the responses of the post-filter at the second harmonic and the third harmonic of the output signal of the frequency spot $f_2$ being $rdB_{2f2}$ and $rdB_{3f2}$ respectively. The extending unit 403 extends the responses of the post-filter to a whole band according to the responses of the post-filter at the fundamental wave, the second harmonic and the third harmonic of the output signal of the frequency spots $f_1$ and $f_2$. In this embodiment, an existing method may be used for the extension. For example, methods of linear interpolation and endmost point maintenance may be used for the extension.

In this embodiment, after the extending unit 403 extends the responses of the post-filter to the whole band, the second calculating unit 102 inputs the calculated responses of the post-filter to the third calculating unit 103, and the third calculating unit 103 calculates the responses of the pre-filter of the nonlinear model of the system to be measured according to the measured responses of the linear filter of the system to be measured and the responses of the post-filter of the nonlinear model of the system to be measured calculated by the second calculating unit 102. A structure of the third calculating unit 103 and a method for calculating the responses of the pre-filter shall be illustrated below.

Figure 5:
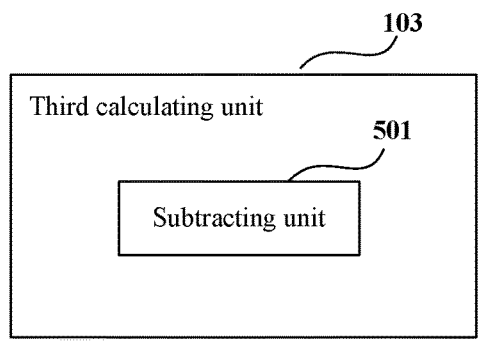
FIG. 5 is a schematic diagram of a structure of the third calculating unit 103 of Embodiment 1 of the present disclosure.

FIG. 5 is a schematic diagram of a structure of the third calculating unit 103 of this embodiment. As shown in FIG. 5, the third calculating unit 103 includes a subtracting unit 501.

The subtracting unit 501 is configured to subtract the responses of the post-filter of the nonlinear model of the system to be measured calculated by the second calculating unit 102 from the measured linear filter responses of the system to be measured, so as to obtain the responses of the pre-filter of the nonlinear model of the system to be measured.

Figure 6:
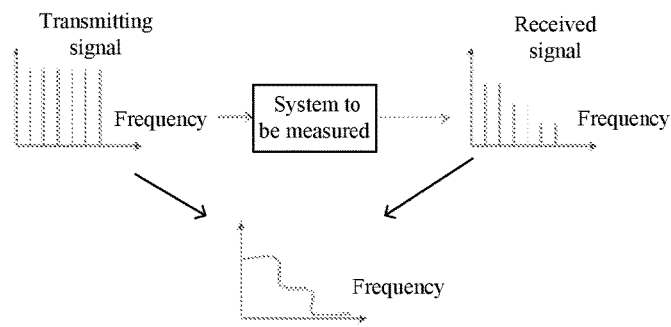
FIG. 6 is a schematic diagram of measuring responses of the linear filter of the system to be measured of Embodiment 1 of the present disclosure.

In this embodiment, the responses of the linear filter of the system to be measured may be measured by using an existing method. FIG. 6 is a schematic diagram of measuring responses of the linear filter of the system to be measured of this embodiment. As shown in FIG. 6, sinusoidal signals of multiple frequency spots are transmitted to the system to be measured, received signals are obtained at an output end of the system to be measured, and power of the received signals is divided by power of the transmission signals according to corresponding frequencies, so as to obtain the responses of the linear filter of the system to be measured.

In this embodiment, the subtracting unit 501 may calculate the response of the pre-filter of the nonlinear model according to Formula (6) below:

$$L1=L-L2 \quad (6);$$

where, L1 denotes a response of the pre-filter of the nonlinear model, L denotes a response of the linear filter of the system to be measured, and L2 denotes a response of the post-filter of the nonlinear model.

In this embodiment, after the first calculating unit 101, the second calculating unit 102 and the third calculating unit 103 calculate the nonlinear coefficients of the nonlinear model of the system to be measured, the responses of the post-filter and the responses of the pre-filter, the estimating unit 104 estimates the nonlinear characteristic of the system to be measured according to the nonlinear coefficients, the responses of the post-filter and the responses of the pre-filter.

In this embodiment, as the response L1 of the pre-filter 201, the nonlinear coefficients $c_2$ and $c_3$ of the memoryless nonlinear transfer function 202 and the response L2 of the post-filter 203 in FIG. 2 are obtained, for the input signal x(n), the output signal y(n) may be obtained, and the estimating unit 104 may compare the output signal y(n) with the input signal x(n), so as to obtain the nonlinear characteristic of the system to be measured.

In this embodiment, the apparatus 100 may further include an adjusting unit 107 configured to adjust input and/or parameters of the system to be measured at least once; and the first calculating unit 101, the second calculating unit 102 and the third calculating unit 103 calculate the nonlinear coefficients, the responses of the post-filter and the responses of the pre-filter of the nonlinear model of the system to be measured after each.

An averaging unit 108 configured to average the nonlinear coefficients, the responses of the post-filter and the responses of the pre-filter of the nonlinear model of the system to be measured before adjustment and the nonlinear coefficients, the responses of the post-filter and the responses of the pre-filter of the nonlinear model of the system to be measured after each adjustment, calculated by the first calculating unit 101, the second calculating unit 102 and the third calculating unit 103, so as to obtain averaged nonlinear coefficients, responses of the post-filter and responses of the pre-filter of the nonlinear model of the system to be measured.

The estimating unit 104 estimates the nonlinear characteristic of the system to be measured according to the nonlinear coefficients, responses of the post-filter and responses of the pre-filter of the nonlinear model of the system to be measured averaged by the averaging unit 108.

In this embodiment, the adjusting unit 107 and the averaging unit 108 are optional, which are shown by dotted boxes in FIG. 1.

In this embodiment, the adjusting unit 107 may adjust the input of the system to be measured. For example, it may adjust input power of the system to be measured or a spectral shape of an input signal; and the adjusting unit 107 may also adjust the parameters of the system to be measured. For example, when the system to be measured is an amplifier, it adjusts a gain of the amplifier; when the system to be measured is a laser, it adjusts a modulation depth of the laser; and when the system to be measured is a communication system, it adjusts input power or a transmission length of the communication system; furthermore, the adjusting unit 107 may also adjust both the input and parameters of the system to be measured.

In this embodiment, the adjusting unit 107 may adjust the input and/or the parameters of the system to be measured at least once. For example, the number of times of adjustment may be defined according to an actual situation.

In this embodiment, the methods of the first calculating unit 101, the second calculating unit 102 and the third calculating unit 103 for calculating the nonlinear coefficients of the nonlinear model, the responses of the post-filter and the responses of the pre-filter, of the system to be measured after each adjustment, are identical to those described above, and shall not be described herein any further.

In this way, by obtaining multiple groups of parameters of the nonlinear model by adjusting the input and/or the parameters of the system to be measured, and by estimating the nonlinear characteristic of the system to be measured according to the averaged nonlinear coefficients of the nonlinear model, the accuracy of the result of estimation may further be improved, and the range of application is relatively broad.

In this embodiment, description is given taking the measurement of the fundamental power and harmonic power of two frequency spots as examples. However, embodiments of the present disclosure are also applicable to cases of three or more frequency spots, with a method of calculation being similar to that for the case of two frequency spots, which shall not be described herein any further. When the number of measured frequency spots is increased, the number of frequency spots extended by the extending unit 403 is also increased.

It can be seen from the above embodiment that the nonlinear characteristic of the system to be measured may be simply and quickly estimated by calculating parameters of the nonlinear model of the system to be measured according to the measured fundamental power and harmonic power of output signals of the system to be measured on at least two frequency spots, with the accuracy of the result of estimation being relatively high.

Embodiment 2

Figure 7:
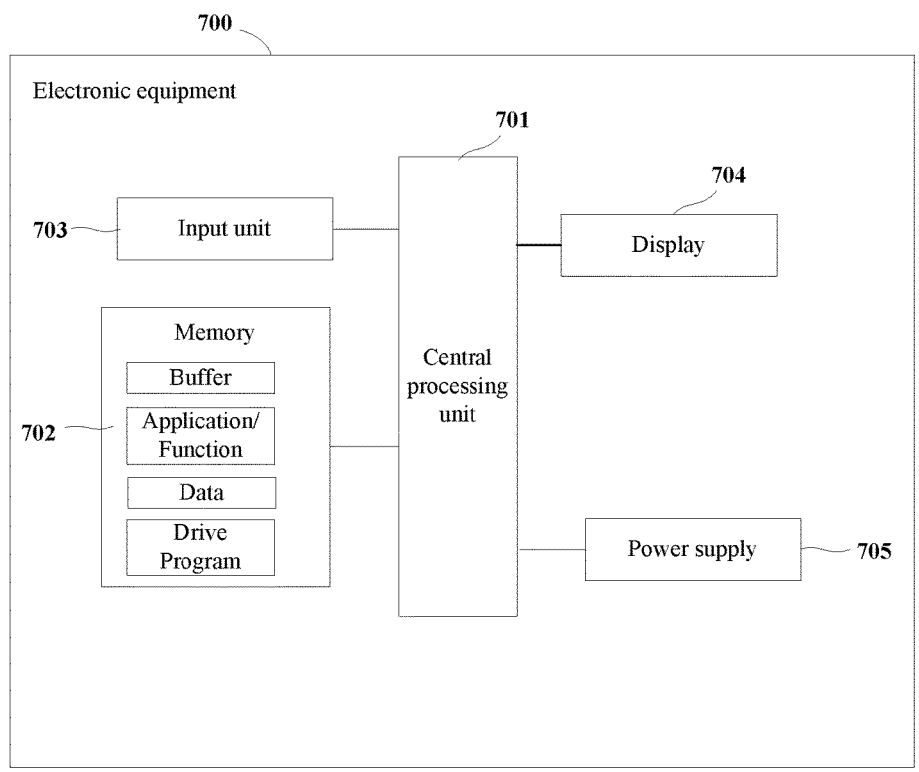
FIG. 7 is a block diagram of a system structure of the electronic equipment 700 of Embodiment 2 of the present disclosure.

An embodiment of the present disclosure further provides electronic equipment, including the estimation apparatus for a nonlinear characteristic described in Embodiment 1. FIG. 7 is a block diagram of a system structure of the electronic equipment 700 of Embodiment 2 of the present disclosure. As shown in FIG. 7, the electronic equipment 700 may include a central processing unit 701 and a memory 702, the memory 702 being coupled to the central processing unit 701. This figure is exemplary only, and other types of structures may be used to supplement or replace this structure for the realization of telecommunications functions or other functions. The electronic equipment may be equipment that is separately manufactured and used, and may also be a module integrated into a receiver or a transmitter of a communication system.

As shown in FIG. 7, the electronic equipment 700 may further include an input unit 703, a display 704, and a power supply 705.

In an implementation, the functions of the estimation apparatus for a nonlinear characteristic described in Embodiment 1 may be integrated into the central processing unit 701. In this embodiment, the central processing unit 701 may be configured to respectively calculate groups of nonlinear coefficients of a nonlinear model of a system to be measured corresponding to frequency spots according to measured fundamental power and harmonic power of output signals of the system to be measured on at least two frequency spots, and take nonlinear coefficients corresponding to one of the at least two frequency spots as nonlinear coefficients of the nonlinear model of the system to be measured; calculate responses of a post-filter of the nonlinear model of the system to be measured according to the groups of nonlinear coefficients of the nonlinear model of the system to be measured corresponding to the frequency spots; calculate responses of a pre-filter of the nonlinear model of the system to be measured according to measured linear filter responses of the system to be measured and the responses of the post-filter of the nonlinear model of the system to be measured; and estimate a nonlinear characteristic of the system to be measured according to the nonlinear coefficients of the nonlinear model of the system to be measured, the responses of the post-filter of the nonlinear model of the system to be measured and the responses of the pre-filter of the nonlinear model of the system to be measured.

In this embodiment, the respectively calculating groups of nonlinear coefficients of a nonlinear model of a system to be measured corresponding to frequency spots according to measured fundamental power and harmonic power of output signals of the system to be measured on at least two frequency spots includes: calculating the nonlinear coefficients by using different methods according to different symbols of the nonlinear coefficients.

In this embodiment, the calculating responses of a post-filter of the nonlinear model of the system to be measured according to the groups of nonlinear coefficients of the nonlinear model of the system to be measured corresponding to the frequency spots includes: setting the responses of the post-filter of the nonlinear model at a fundamental wave and harmonics of an output signal of one of the at least two frequency spots to be 0 dB, and setting the responses of the post-filter of the nonlinear model at fundamental waves of output signals of other frequency spots of the at least two frequency spots to be a predefined value; calculating the responses of the post-filter of the nonlinear model at harmonics of the output signals of the other frequency spots according to the groups of nonlinear coefficients corresponding to the one of the at least two frequency spots and the other frequency spots; wherein, in calculating the responses of the post-filter of the nonlinear model at harmonics of the output signals of the other frequency spots, the harmonic power of the output signals of the nonlinear model on the at least two frequency spots is made to be identical to the measured harmonic power of the output signals of the system to be measured on the at least two frequency spots; and extending the responses of the post-filter to a whole band according to the responses of the post-filter at the fundamental wave and the harmonics of the at least two frequency spots.

In this embodiment, the calculating responses of a pre-filter of the nonlinear model of the system to be measured according to measured linear filter responses of the system to be measured and the responses of the post-filter of the nonlinear model of the system to be measured includes: subtracting the responses of the post-filter of the nonlinear model of the system to be measured from the measured linear filter responses of the system to be measured, so as to obtain the responses of the pre-filter of the nonlinear model of the system to be measured.

In this embodiment, the central processing unit 701 may further be configured to adjust input and/or parameters of the system to be measured at least once; calculate the nonlinear coefficients, the responses of the post-filter and the responses of the pre-filter of the nonlinear model of the system to be measured after each adjustment; average the nonlinear coefficients, the responses of the post-filter and the responses of the pre-filter of the nonlinear model of the system to be measured before adjustment and the nonlinear coefficients, the responses of the post-filter and the responses of the pre-filter of the nonlinear model of the system to be measured after each adjustment, so as to obtain averaged nonlinear coefficients, responses of the post-filter and responses of the pre-filter of the nonlinear model of the system to be measured; and estimate the nonlinear characteristic of the system to be measured according to the averaged nonlinear coefficients, responses of the post-filter and responses of the pre-filter of the nonlinear model of the system to be measured.

In this embodiment, the central processing unit 701 may further be configured to respectively transmit signals of at least two frequency spots in turn, or transmit signals of at least two frequency spots at the same time, to the system to be measured, so as to be used for measuring the fundamental power and harmonic power of the output signals of the system to be measured on at least two frequency spots.

In another implementation, the estimation apparatus for a nonlinear characteristic described in Embodiment 1 and the central processing unit 701 may be configured separately. For example, the estimation apparatus for a nonlinear characteristic may be configured as a chip connected to the central processing unit 701, with its functions being realized under control of the central processing unit 701.

In this embodiment, the electronic equipment 700 does not necessarily include all the parts shown in FIG. 7.

As shown in FIG. 7, the central processing unit 701 is sometimes referred to as a controller or control, and may include a microprocessor or other processor devices and/or logic devices. The central processing unit 701 receives input and controls operations of every components of the electronic equipment 700.

The memory 702 may be, for example, one or more of a buffer memory, a flash memory, a hard drive, a mobile medium, a volatile memory, a nonvolatile memory, or other suitable devices. And the central processing unit 701 may execute a program stored in the memory 702, so as to realize information storage or processing, etc. Functions of other parts are similar to those of the prior art, which shall not be described herein any further. The parts of the electronic equipment 700 may be realized by specific hardware, firmware, software, or any combination thereof, without departing from the scope of the present disclosure.

It can be seen from the above embodiment that the nonlinear characteristic of the system to be measured may be simply and quickly estimated by calculating parameters of the nonlinear model of the system to be measured according to the measured fundamental power and harmonic power of output signals of the system to be measured on at least two frequency spots, with the accuracy of the result of estimation being relatively high.

Embodiment 3

An embodiment of the present disclosure further provides a communication system, including electronic equipment and other parts and devices used for communication, such as a receiver, a transmitter, an optical fiber link, a laser, and an amplifier, etc. A structure and function of the electronic equipment are identical to that described in Embodiment 2, and shall not be described herein any further. And one or more of the other parts and devices used for communication correspond(s) to the system to be measured described in embodiments 1 and 2, with parts and devices included in the system to be measured may be determined according to an actual situation.

It can be seen from the above embodiment that the nonlinear characteristic of the system to be measured may be simply and quickly estimated by calculating parameters of the nonlinear model of the system to be measured according to the measured fundamental power and harmonic power of output signals of the system to be measured on at least two frequency spots, with the accuracy of the result of estimation being relatively high.

Embodiments of the present disclosure further provide an estimation method for a nonlinear characteristic, as described in embodiments 4 and 5 below. As the principles of the method for solving problems are similar to the functions of the components of the estimation apparatus for a nonlinear characteristic of Embodiment 1, the implementation of the estimation apparatus for a nonlinear characteristic of Embodiment 1 may be referred to for the implementation of the method, and the repeated parts shall not be described any further.

Embodiment 4

Figure 8:
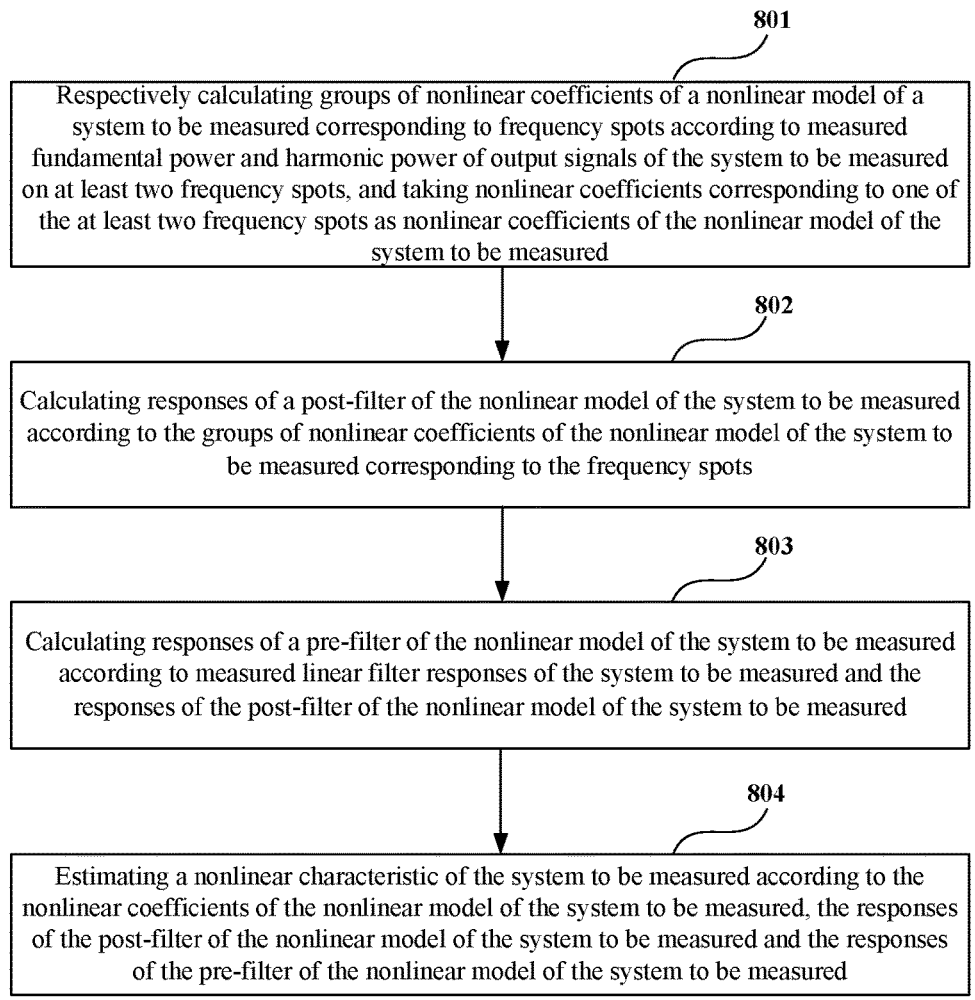
FIG. 8 is a flowchart of the estimation method for a nonlinear characteristic of Embodiment 4 of the present disclosure.

FIG. 8 is a flowchart of the estimation method for a nonlinear characteristic of Embodiment 4 of the present disclosure. As shown in FIG. 8, the method includes:

Step 801: respectively calculating groups of nonlinear coefficients of a nonlinear model of a system to be measured corresponding to frequency spots according to measured fundamental power and harmonic power of output signals of the system to be measured on at least two frequency spots, and taking nonlinear coefficients corresponding to one of the at least two frequency spots as nonlinear coefficients of the nonlinear model of the system to be measured.

Step 802: calculating responses of a post-filter of the nonlinear model of the system to be measured according to the groups of nonlinear coefficients of the nonlinear model of the system to be measured corresponding to the frequency spots.

Step 803: calculating responses of a pre-filter of the nonlinear model of the system to be measured according to measured linear filter responses of the system to be measured and the responses of the post-filter of the nonlinear model of the system to be measured.

Step 804: estimating a nonlinear characteristic of the system to be measured according to the nonlinear coefficients of the nonlinear model of the system to be measured, the responses of the post-filter of the nonlinear model of the system to be measured and the responses of the pre-filter of the nonlinear model of the system to be measured.

In this embodiment, the methods for measuring fundamental power, the harmonic power and the responses of the linear filter, the methods for calculating the groups of nonlinear coefficients, the responses of the post-filter and the responses of the pre-filter and the method for estimating the nonlinear characteristic according to the results of the above calculation are identical to those described in Embodiment 1, and shall not be described herein any further.

It can be seen from the above embodiment that the nonlinear characteristic of the system to be measured may be simply and quickly estimated by calculating parameters of the nonlinear model of the system to be measured according to the measured fundamental power and harmonic power of output signals of the system to be measured on at least two frequency spots, with the accuracy of the result of estimation being relatively high.

For example, in an implementation, the respectively calculating groups of nonlinear coefficients of a nonlinear model of a system to be measured corresponding to frequency spots according to measured fundamental power and harmonic power of output signals of the system to be measured on at least two frequency spots includes: calculating the nonlinear coefficients by using different methods according to different symbols of the nonlinear coefficients.

In an implementation of this embodiment, the calculating responses of a post-filter of the nonlinear model of the system to be measured according to the groups of nonlinear coefficients of the nonlinear model of the system to be measured corresponding to the frequency spots includes: setting the responses of the post-filter of the nonlinear model at a fundamental wave and harmonics of an output signal of one of the at least two frequency spots to be 0 dB, and setting the responses of the post-filter of the nonlinear model at fundamental waves of output signals of other frequency spots of the at least two frequency spots to be a predefined value; calculating the responses of the post-filter of the nonlinear model at harmonics of the output signals of the other frequency spots according to the groups of nonlinear coefficients corresponding to the one of the at least two frequency spots and the other frequency spots; wherein, in calculating the responses of the post-filter of the nonlinear model at harmonics of the output signals of the other frequency spots, the harmonic power of the output signals of the nonlinear model on the at least two frequency spots is made to be identical to the measured harmonic power of the output signals of the system to be measured on the at least two frequency spots; and extending the responses of the post-filter to a whole band according to the responses of the post-filter at the fundamental wave and the harmonics of the at least two frequency spots.

In an implementation of this embodiment, the calculating responses of a pre-filter of the nonlinear model of the system to be measured according to measured linear filter responses of the system to be measured and the responses of the post-filter of the nonlinear model of the system to be measured includes: subtracting the responses of the post-filter of the nonlinear model of the system to be measured from the measured linear filter responses of the system to be measured, so as to obtain the responses of the pre-filter of the nonlinear model of the system to be measured.

In an implementation of this embodiment, the method further includes: adjusting input and/or parameters of the system to be measured at least once; and calculating the nonlinear coefficients, the responses of the post-filter and the responses of the pre-filter of the nonlinear model of the system to be measured after each adjustment; averaging the nonlinear coefficients, the responses of the post-filter and the responses of the pre-filter of the nonlinear model of the system to be measured before adjustment and the nonlinear coefficients, the responses of the post-filter and the responses of the pre-filter of the nonlinear model of the system to be measured after each adjustment, so as to obtain averaged nonlinear coefficients, responses of the post-filter and responses of the pre-filter of the nonlinear model of the system to be measured; and estimating the nonlinear characteristic of the system to be measured according to the averaged nonlinear coefficient, responses of the post-filter and responses of the pre-filter of the nonlinear model of the system to be measured.

In an implementation of this embodiment, the method further includes: respectively transmitting signals of at least two frequency spots in turn, or transmitting signals of at least two frequency spots at the same time, to the system to be measured, so as to be used for measuring the fundamental power and harmonic power of the output signals of the system to be measured on at least two frequency spots.

Embodiment 5

Figure 9:
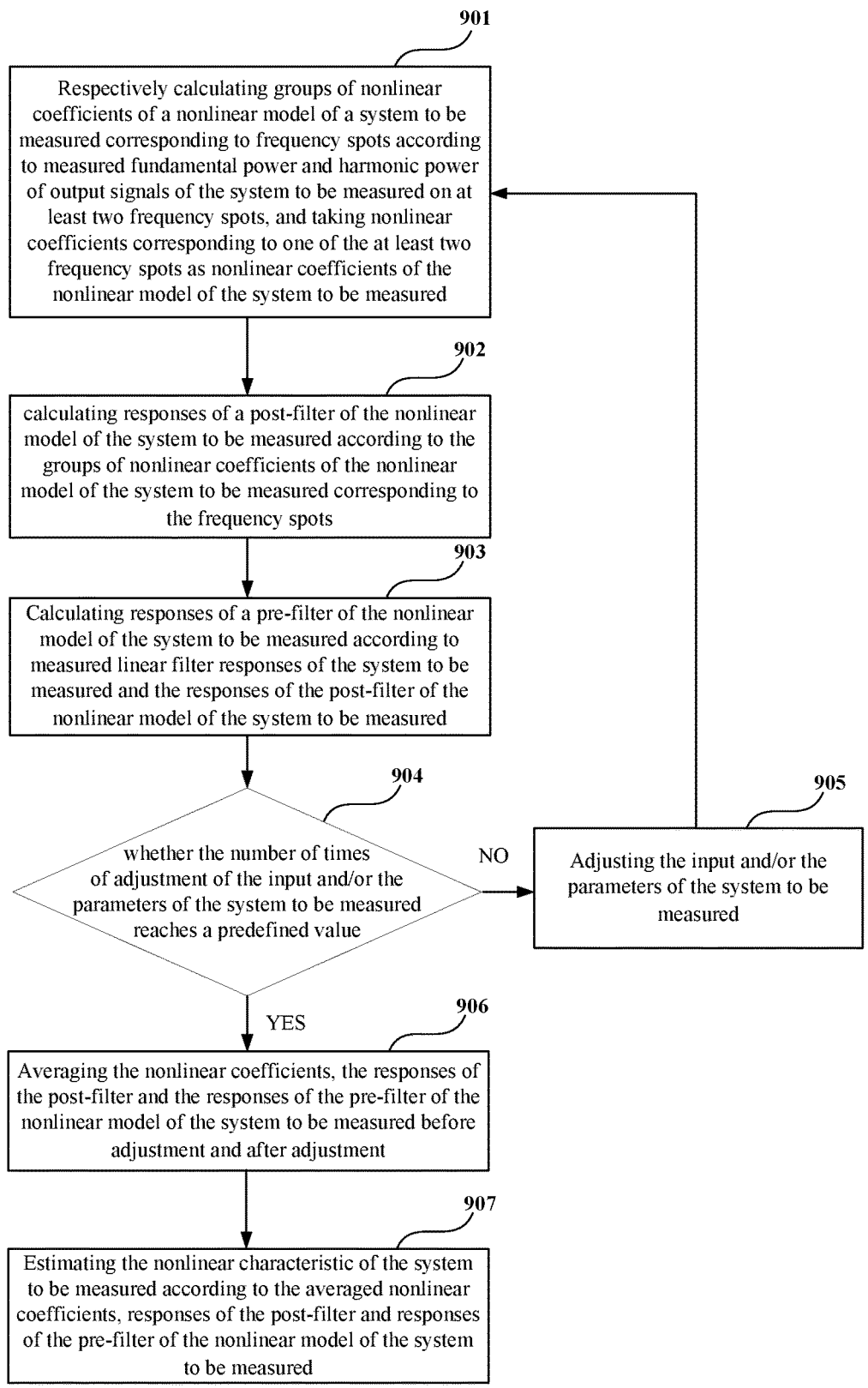
FIG. 9 is a flowchart of the estimation method for a nonlinear characteristic of Embodiment 5 of the present disclosure.

FIG. 9 is a flowchart of the estimation method for a nonlinear characteristic of Embodiment 5 of the present disclosure. As shown in FIG. 9, the method includes Step 901: respectively calculating groups of nonlinear coefficients of a nonlinear model of a system to be measured corresponding to frequency spots according to measured fundamental power and harmonic power of output signals of the system to be measured on at least two frequency spots, and taking nonlinear coefficients corresponding to one of the at least two frequency spots as nonlinear coefficients of the nonlinear model of the system to be measured.

Step 902: calculating responses of a post-filter of the nonlinear model of the system to be measured according to the groups of nonlinear coefficients of the nonlinear model of the system to be measured corresponding to the frequency spots.

Step 903: calculating responses of a pre-filter of the nonlinear model of the system to be measured according to measured linear filter responses of the system to be measured and the responses of the post-filter of the nonlinear model of the system to be measured.

Step 904: judging whether the number of times of adjustment of the input and/or the parameters of the system to be measured reaches a predefined value; entering into step 905 when a result of judgment is "no"; and entering into step 906 when a result of judgment is "yes". In this embodiment, the predefined value may be determined according to an actual situation;

Step 905: adjusting the input and/or the parameters of the system to be measured.

Step 906: averaging the nonlinear coefficients, the responses of the post-filter and the responses of the pre-filter of the nonlinear model of the system to be measured before adjustment and after each adjustment.

Step 907: estimating the nonlinear characteristic of the system to be measured according to the averaged nonlinear coefficients, responses of the post-filter and responses of the pre-filter of the nonlinear model of the system to be measured.

In this embodiment, the methods for measuring fundamental power, the harmonic power and the responses of the linear filter, the methods for calculating the groups of nonlinear coefficients, the responses of the post-filter and the responses of the pre-filter, the method for adjusting the input and/or parameter of the system to be measured and the method for estimating the nonlinear characteristic according to the results of calculation are identical to those described in Embodiment 1, and shall not be described herein any further.

It can be seen from the above embodiment that the nonlinear characteristic of the system to be measured may be simply and quickly estimated by calculating parameters of the nonlinear model of the system to be measured according to the measured fundamental power and harmonic power of output signals of the system to be measured on at least two frequency spots, with the accuracy of the result of estimation being relatively high.

And by obtaining multiple groups of parameters of the nonlinear model by adjusting the input and/or the parameters of the system to be measured, and by estimating the nonlinear characteristic of the system to be measured according to the averaged nonlinear coefficients of the nonlinear model, the accuracy of the result of estimation may further be improved, and the range of application is relatively broad.

An embodiment of the present disclosure further provides a computer-readable program, wherein when the program is executed in an estimation apparatus for a nonlinear characteristic or electronic equipment, the program enables the estimation apparatus for a nonlinear characteristic or the electronic equipment to carry out the estimation method for a nonlinear characteristic as described in Embodiment 4 or 5.

An embodiment of the present disclosure further provides a storage medium in which a computer-readable program is stored, wherein the computer-readable program enables an estimation apparatus for a nonlinear characteristic or electronic equipment to carry out the estimation method for a nonlinear characteristic as described in Embodiment 4 or 5.

The above apparatuses and methods of the present disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the principles of the present disclosure, and such variants and modifications fall within the scope of the present disclosure.

For the implementation of the present disclosure containing the above embodiments, following supplements are further disclosed.

Supplement 1. An estimation apparatus for a nonlinear characteristic, including a first calculating unit configured to respectively calculate groups of nonlinear coefficients of a nonlinear model of a system to be measured corresponding to frequency spots according to measured fundamental power and harmonic power of output signals of the system to be measured on at least two frequency spots, and take nonlinear coefficients corresponding to one of the at least two frequency spots as nonlinear coefficients of the nonlinear model of the system to be measured.

A second calculating unit configured to calculate responses of a post-filter of the nonlinear model of the system to be measured according to the groups of nonlinear coefficients of the nonlinear model of the system to be measured corresponding to the frequency spots calculated by the first calculating unit.

A third calculating unit configured to calculate responses of a pre-filter of the nonlinear model of the system to be measured according to measured linear filter responses of the system to be measured and the responses of the post-filter of the nonlinear model of the system to be measured calculated by the second calculating unit.

An estimating unit configured to estimate a nonlinear characteristic of the system to be measured according to the nonlinear coefficients of the nonlinear model of the system to be measured calculated by the first calculating unit, the responses of the post-filter of the nonlinear model of the system to be measured calculated by the second calculating unit and the responses of the pre-filter of the nonlinear model of the system to be measured calculated by the third calculating unit.

Supplement 2. The apparatus according to supplement 1, where, in respectively calculating the groups of nonlinear coefficients of the nonlinear model of the system to be measured corresponding to the frequency spots, the first calculating unit calculates the nonlinear coefficients by using different methods according to different symbols of the nonlinear coefficients.

Supplement 3. The apparatus according to supplement 2, wherein the first calculating unit calculates the nonlinear coefficients according to Formula (1) below when the nonlinear coefficients are negative numbers, and calculates the nonlinear coefficients according to Formula (2) below when the nonlinear coefficients are positive numbers:

$$\begin{cases} A = \sqrt{2P_{1,1}} + 3\sqrt{2P_{1,3}} \\ c_2 = -\dfrac{2\sqrt{2P_{1,2}}}{A^2} \\ c_3 = -\dfrac{4\sqrt{2P_{1,3}}}{A^3} \end{cases} \quad (1)$$

$$\begin{cases} A = \sqrt{2P_{1,1}} - 3\sqrt{2P_{1,3}} \\ c_2 = \dfrac{2\sqrt{2P_{1,2}}}{A^2} \\ c_3 = \dfrac{4\sqrt{2P_{1,3}}}{A^3} \end{cases} \quad (2)$$

where, $c_2$ and $c_3$ denote the nonlinear coefficients corresponding to one of the at least two frequency spots, and $P_{1,1}$, $P_{1,2}$ and $P_{1,3}$ respectively denote the fundamental power, second harmonic power and third harmonic power of the output signal of the system to be measured on the frequency spot.

Supplement 4. The apparatus according to supplement 1, wherein the second calculating unit includes a setting unit configured to set the responses of the post-filter of the nonlinear model at a fundamental wave and harmonics of an output signal of one of the at least two frequency spots to be 0 dB, and set the responses of the post-filter of the nonlinear model at fundamental waves of output signals of other frequency spots of the at least two frequency spots to be a predefined value.

A fourth calculating unit configured to calculate the responses of the post-filter of the nonlinear model at harmonics of the output signals of the other frequency spots according to the groups of nonlinear coefficients corresponding to the one of the at least two frequency spots and the other frequency spots calculated by the first calculating unit; wherein, in calculating the responses of the post-filter of the nonlinear model at harmonics of the output signals of the other frequency spots, the harmonic power of the output signals of the nonlinear model on the at least two frequency spots is made to be identical to the measured harmonic power of the output signals of the system to be measured on the at least two frequency spots.

An extending unit configured to extend the responses of the post-filter to a whole band according to the responses of the post-filter at the fundamental wave and the harmonics of the at least two frequency spots.

Supplement 5. The apparatus according to supplement 1, wherein the third calculating unit includes a subtracting unit configured to subtract the responses of the post-filter of the nonlinear model of the system to be measured calculated by the second calculating unit from the measured linear filter responses of the system to be measured, so as to obtain the responses of the pre-filter of the nonlinear model of the system to be measured.

Supplement 6. The apparatus according to supplement 1, wherein the apparatus further includes an adjusting unit configured to adjust input and/or parameters of the system to be measured at least once; and the first calculating unit, the second calculating unit and the third calculating unit calculate the nonlinear coefficients, the responses of the post-filter and the responses of the pre-filter of the nonlinear model of the system to be measured after each adjustment.

An averaging unit configured to average the nonlinear coefficients, the responses of the post-filter and the responses of the pre-filter of the nonlinear model of the system to be measured before adjustment and the nonlinear coefficients, the responses of the post-filter and the responses of the pre-filter of the nonlinear model of the system to be measured after each adjustment, calculated by the first calculating unit, the second calculating unit and the third calculating unit, so as to obtain averaged nonlinear coefficients, responses of the post-filter and responses of the pre-filter of the nonlinear model of the system to be measured.

The estimating unit estimates the nonlinear characteristic of the system to be measured according to the nonlinear coefficients, responses of the post-filter and responses of the pre-filter of the nonlinear model of the system to be measured averaged by the averaging unit.

Supplement 7. The apparatus according to supplement 1, wherein the apparatus further includes a transmitting unit configured to respectively transmit signals of at least two frequency spots in turn, or transmit signals of at least two frequency spots at the same time, to the system to be measured, so as to be used for measuring the fundamental power and harmonic power of the output signals of the system to be measured on at least two frequency spots.

Supplement 8. Electronic equipment, including the apparatus as described in any one of supplements 1-7.

Supplement 9. An estimation method for a nonlinear characteristic, including respectively calculating groups of nonlinear coefficients of a nonlinear model of a system to be measured corresponding to frequency spots according to measured fundamental power and harmonic power of output signals of the system to be measured on at least two frequency spots, and taking nonlinear coefficients corresponding to one of the at least two frequency spots as nonlinear coefficients of the nonlinear model of the system to be measured.

An estimation method for a nonlinear characteristic includes calculating responses of a post-filter of the nonlinear model of the system to be measured according to the groups of nonlinear coefficients of the nonlinear model of the system to be measured corresponding to the frequency spots; and calculating responses of a pre-filter of the nonlinear model of the system to be measured according to measured linear filter responses of the system to be measured and the responses of the post-filter of the nonlinear model of the system to be measured.

An estimation method for a nonlinear characteristic includes estimating a nonlinear characteristic of the system to be measured according to the nonlinear coefficients of the nonlinear model of the system to be measured, the responses of the post-filter of the nonlinear model of the system to be measured and the responses of the pre-filter of the nonlinear model of the system to be measured.

Supplement 10. The method according to supplement 9, where, the respectively calculating the groups of nonlinear coefficients of the nonlinear model of the system to be measured corresponding to the frequency spots according to the measured fundamental power and harmonic power of output signals of the system to be measured on at least two frequency spots includes: calculating the nonlinear coefficients by using different methods according to different symbols of the nonlinear coefficients.

Supplement 11. The method according to supplement 10, wherein the nonlinear coefficients are calculated according to Formula (1) below when the nonlinear coefficients are negative numbers, and the nonlinear coefficients are calculated according to Formula (2) below when the nonlinear coefficients are positive numbers:

$$\begin{cases} A = \sqrt{2P_{1,1}} + 3\sqrt{2P_{1,3}} \\ c_2 = -\dfrac{2\sqrt{2P_{1,2}}}{A^2} \\ c_3 = -\dfrac{4\sqrt{2P_{1,3}}}{A^3} \end{cases} \quad (1)$$

$$\begin{cases} A = \sqrt{2P_{1,1}} - 3\sqrt{2P_{1,3}} \\ c_2 = \dfrac{2\sqrt{2P_{1,2}}}{A^2} \\ c_3 = \dfrac{4\sqrt{2P_{1,3}}}{A^3} \end{cases} \quad (2)$$

where, $c_2$ and $c_3$ denote the nonlinear coefficients corresponding to one of the at least two frequency spots, and $P_{1,1}$, $P_{1,2}$ and $P_{1,3}$ respectively denote the fundamental power, second harmonic power and third harmonic power of the output signal of the system to be measured on the frequency spot.

Supplement 12. The method according to supplement 9, wherein the calculating responses of a post-filter of the nonlinear model of the system to be measured according to the groups of nonlinear coefficients of the nonlinear model of the system to be measured corresponding to the frequency spots includes: setting the responses of the post-filter of the nonlinear model at a fundamental wave and harmonics of an output signal of one of the at least two frequency spots to be 0 dB, and setting the responses of the post-filter of the nonlinear model at fundamental waves of output signals of other frequency spots of the at least two frequency spots to be a predefined value; calculating the responses of the post-filter of the nonlinear model at harmonics of the output signals of the other frequency spots according to the groups of nonlinear coefficients corresponding to the one of the at least two frequency spots and the other frequency spots; wherein, in calculating the responses of the post-filter of the nonlinear model at harmonics of the output signals of the other frequency spots, the harmonic power of the output signals of the nonlinear model on the at least two frequency spots is made to be identical to the measured harmonic power of the output signals of the system to be measured on the at least two frequency spots; and extending the responses of the post-filter to a whole band according to the responses of the post-filter at the fundamental wave and the harmonics of the at least two frequency spots.

Supplement 13. The method according to supplement 12, wherein the calculating responses of a pre-filter of the nonlinear model of the system to be measured according to measured linear filter responses of the system to be measured and the responses of the post-filter of the nonlinear model of the system to be measured includes: subtracting the responses of the post-filter of the nonlinear model of the system to be measured from the measured linear filter responses of the system to be measured, so as to obtain the responses of the pre-filter of the nonlinear model of the system to be measured.

Supplement 14. The method according to supplement 9, wherein the method further includes: adjusting input and/or parameters of the system to be measured at least once, and calculating the nonlinear coefficients, the responses of the post-filter and the responses of the pre-filter of the nonlinear model of the system to be measured after each adjustment; averaging the nonlinear coefficients, the responses of the post-filter and the responses of the pre-filter of the nonlinear model of the system to be measured before adjustment and the nonlinear coefficients, the responses of the post-filter and the responses of the pre-filter of the nonlinear model of the system to be measured after each adjustment, so as to obtain averaged nonlinear coefficients, responses of the post-filter and responses of the pre-filter of the nonlinear model of the system to be measured; and estimating the nonlinear characteristic of the system to be measured according to the averaged nonlinear coefficient, responses of the post-filter and responses of the pre-filter of the nonlinear model of the system to be measured.

Supplement 15. The method according to supplement 9, wherein the method further includes: respectively transmitting signals of at least two frequency spots in turn, or transmitting signals of at least two frequency spots at the same time, to the system to be measured, so as to be used for measuring the fundamental power and harmonic power of the output signals of the system to be measured on at least two frequency spots.

The embodiments can be implemented in computing hardware (computing apparatus) and/or software, such as (in a non-limiting example) any computer that can calculate, store, retrieve, process and/or output data and/or communicate with other computers. The results produced can be displayed on a display of the computing hardware. A program/software implementing the embodiments may be recorded on computer-readable media comprising computer-readable recording media. The program/software implementing the embodiments may also be transmitted over transmission communication media. Further, according to an aspect of the embodiments, any combinations of the described features, functions and/or operations can be provided.

What is claimed is:

1. An estimation apparatus for estimating a nonlinear characteristic of a system to be measured of a communication system, to improve the communication system performance by dealing with the nonlinear characteristic of the system, the estimation apparatus is configured in one of an electronic equipment and a receiver and a transmitter of the communication system, the estimation apparatus comprising:

a first calculating unit configured to respectively calculate groups of nonlinear coefficients of the nonlinear model of the system to be measured corresponding to frequency spots according to measured fundamental power and harmonic power of output signals of the system to be measured on at least two frequency spots, and take nonlinear coefficients corresponding to one of the at least two frequency spots as nonlinear coefficients of the nonlinear model of the system to be measured;

a second calculating unit configured to calculate responses of a post-filter of the nonlinear model of the system to be measured according to the groups of nonlinear coefficients of the nonlinear model of the system to be measured corresponding to the frequency spots calculated by the first calculating unit;

a third calculating unit configured to calculate responses of a pre-filter of the nonlinear model of the system to be measured according to measured linear filter responses of the system to be measured and the responses of the post-filter of the nonlinear model of the system to be measured calculated by the second calculating unit; and an estimating unit configured to estimate the nonlinear characteristic of the system to be measured according to the nonlinear coefficients of the nonlinear model of the system to be measured calculated by the first calculating unit, the responses of the post-filter of the nonlinear model of the system to be measured calculated by the second calculating unit and the responses of the pre-filter of the nonlinear model of the system to be measured calculated by the third calculating unit.

2. The apparatus according to claim 1, wherein,
in respectively calculating the groups of nonlinear coefficients of the nonlinear model of the system to be measured corresponding to the frequency spots, the first calculating unit calculates the nonlinear coefficients by using different methods according to different symbols of the nonlinear coefficients.

3. The apparatus according to claim 2, wherein the first calculating unit calculates the nonlinear coefficients according to Formula (1) below when the nonlinear coefficients are negative numbers, and calculates the nonlinear coefficients according to Formula (2) below when the nonlinear coefficients are positive numbers:

$$\begin{cases} A = \sqrt{2P_{1,1}} + 3\sqrt{2P_{1,3}} \\ c_2 = -\dfrac{2\sqrt{2P_{1,2}}}{A^2} \\ c_3 = -\dfrac{4\sqrt{2P_{1,3}}}{A^3} \end{cases} \quad (1)$$

$$\begin{cases} A = \sqrt{2P_{1,1}} - 3\sqrt{2P_{1,3}} \\ c_2 = \dfrac{2\sqrt{2P_{1,2}}}{A^2} \\ c_3 = \dfrac{4\sqrt{2P_{1,3}}}{A^3} \end{cases} \quad (2)$$

where, $c_2$ and $c_3$ denote the nonlinear coefficients corresponding to one of the at least two frequency spots, and $P_{1,1}$, $P_{1,2}$ and $P_{1,3}$ respectively denote the fundamental power, second harmonic power and third harmonic power of the output signal of the system to be measured on the frequency spot.

4. The apparatus according to claim 1, wherein the second calculating unit comprises:

a setting unit configured to set the responses of the post-filter of the nonlinear model at a fundamental wave and harmonics of an output signal of one of the at least two frequency spots to be 0 dB, and set the responses of the post-filter of the nonlinear model at fundamental waves of output signals of other frequency spots of the at least two frequency spots to be a predefined value;

a fourth calculating unit configured to calculate the responses of the post-filter of the nonlinear model at harmonics of the output signals of the other frequency spots according to the groups of nonlinear coefficients corresponding to the one of the at least two frequency spots and the other frequency spots calculated by the first calculating unit; wherein, in calculating the responses of the post-filter of the nonlinear model at harmonics of the output signals of the other frequency spots, the harmonic power of the output signals of the nonlinear model on the at least two frequency spots is made to be identical to the measured harmonic power of the output signals of the system to be measured on the at least two frequency spots; and an extending unit configured to extend the responses of the post-filter to a whole band according to the responses of the post-filter at the fundamental wave and the harmonics of the at least two frequency spots.

5. The apparatus according to claim 1, wherein the third calculating unit comprises:

a subtracting unit configured to subtract the responses of the post-filter of the nonlinear model of the system to be measured calculated by the second calculating unit from the measured linear filter responses of the system to be measured, so as to obtain the responses of the pre-filter of the nonlinear model of the system to be measured.

6. The apparatus according to claim 1, wherein the apparatus further comprises:

an adjusting unit configured to adjust input and/or parameters of the system to be measured at least once; and the first calculating unit, the second calculating unit and the third calculating unit calculate the nonlinear coefficients, the responses of the post-filter and the responses of the pre-filter of the nonlinear model of the system to be measured after each of the adjustment by the adjusting unit; and an averaging unit configured to average the nonlinear coefficients, calculated by the first calculating unit, the responses of the post-filter, calculated by the second calculating unit, and the responses of the pre-filter of the nonlinear model of the system to be measured, calculated by the third calculating unit, before the adjustment by the adjusting unit and average the nonlinear coefficients, calculated by the first calculating unit, the responses of the post-filter, calculated by the second calculating unit, and the responses of the pre-filter of the nonlinear model of the system to be measured, calculated by the third calculating unit, after each of the adjustment by the adjusting unit, so as to obtain averaged nonlinear coefficients, responses of the post-filter and responses of the pre-filter of the nonlinear model of the system to be measured; and the estimating unit estimates the nonlinear characteristic of the system to be measured according to the nonlinear coefficients, the responses of the post-filter and the responses of the pre-filter of the nonlinear model of the system to be measured averaged by the averaging unit.

7. The apparatus according to claim 1, wherein the apparatus further comprises:

a transmitting unit configured to respectively transmit signals of the at least two frequency spots in turn, or transmit signals of the at least two frequency spots at the same time, to the system to be measured, so as to be used for measuring the fundamental power and harmonic power of the output signals of the system to be measured on the at least two frequency spots.

8. An estimation method applied in the estimation apparatus for a nonlinear characteristic of a system to be measured of a communication system, to improve the communication system performance by dealing with the nonlinear characteristic of the system, the estimation apparatus is configured in one of an electronic equipment and a receiver and a transmitter of the communication system, the estimation method comprising:

respectively calculating groups of nonlinear coefficients of the nonlinear model of the system to be measured corresponding to frequency spots according to measured fundamental power and harmonic power of output signals of the system to be measured on at least two frequency spots, and taking nonlinear coefficients corresponding to one of the at least two frequency spots as nonlinear coefficients of the nonlinear model of the system to be measured;

calculating responses of a post-filter of the nonlinear model of the system to be measured according to the groups of nonlinear coefficients of the nonlinear model of the system to be measured corresponding to the frequency spots;

calculating responses of a pre-filter of the nonlinear model of the system to be measured according to measured linear filter responses of the system to be measured and the responses of the post-filter of the nonlinear model of the system to be measured; and estimating the nonlinear characteristic of the system to be measured according to the nonlinear coefficients of the nonlinear model of the system to be measured, the responses of the post-filter of the nonlinear model of the system to be measured and the responses of the pre-filter of the nonlinear model of the system to be measured.

9. The method according to claim 8, wherein,
the respectively calculating of the groups of nonlinear coefficients of the nonlinear model of the system to be measured corresponding to the frequency spots according to the measured fundamental power and harmonic power of output signals of the system to be measured on the at least two frequency spots comprises:
calculating the nonlinear coefficients by using different methods according to different symbols of the nonlinear coefficients.

10. The method according to claim 8, wherein the method further comprises:
adjusting input and/or parameters of the system to be measured at least once; and the calculating of the nonlinear coefficients, the responses of the post-filter and the responses of the pre-filter of the nonlinear model of the system to be measured after each adjustment of the input and/or parameters of the system to be measured;
averaging the nonlinear coefficients, the responses of the post-filter and the responses of the pre-filter of the nonlinear model of the system to be measured before the adjustment of the input and/or parameters of the system to be measured and averaging the nonlinear coefficients, the responses of the post-filter and the responses of the pre-filter of the nonlinear model of the system to be measured after each adjustment of the input and/or parameters of the system to be measured, so as to obtain averaged nonlinear coefficients, responses of the post-filter and responses of the pre-filter of the nonlinear model of the system to be measured; and
estimating the nonlinear characteristic of the system to be measured according to the averaged nonlinear coefficient, the responses of the post-filter and the responses of the pre-filter of the nonlinear model of the system to be measured.

* * * * *